US012129109B2

(12) United States Patent
Lambert

(10) Patent No.: US 12,129,109 B2
(45) Date of Patent: Oct. 29, 2024

(54) STORAGE SYSTEM FOR VOLATILE LIQUIDS

(71) Applicant: Solaris Oilfield Site Services Operating LLC, Houston, TX (US)

(72) Inventor: Bryan Scott Lambert, The Woodlands, TX (US)

(73) Assignee: SOLARIS OILFIELD SITE SERVICES OPERATING LLC, Houston, TX (US)

( * ) Notice: Subject to any disclaimer, the term of this patent is extended or adjusted under 35 U.S.C. 154(b) by 900 days.

(21) Appl. No.: 17/197,637

(22) Filed: Mar. 10, 2021

(65) Prior Publication Data

US 2021/0214153 A1 Jul. 15, 2021

Related U.S. Application Data

(63) Continuation-in-part of application No. 16/729,708, filed on Dec. 30, 2019.

(60) Provisional application No. 62/795,885, filed on Jan. 23, 2019.

(51) Int. Cl.

| | |
|---|---|
| ***B65D 90/51*** | (2019.01) |
| ***B65D 88/08*** | (2006.01) |
| ***B65D 88/30*** | (2006.01) |
| ***B65D 90/02*** | (2019.01) |
| ***B65D 90/14*** | (2006.01) |
| ***B65D 90/24*** | (2006.01) |
| ***B65D 90/34*** | (2006.01) |
| ***G08B 21/18*** | (2006.01) |

(52) U.S. Cl.

CPC ............. *B65D 90/51* (2019.02); *B65D 88/08* (2013.01); *B65D 88/30* (2013.01); *B65D 90/024* (2013.01); *B65D 90/14* (2013.01); *B65D 90/24* (2013.01); *B65D 90/34* (2013.01); *G08B 21/182* (2013.01)

(58) Field of Classification Search

CPC ................................ B65D 90/34; B65D 90/51

USPC ........................ 366/136, 137, 153.1; 137/563

See application file for complete search history.

(56) References Cited

U.S. PATENT DOCUMENTS

| | | | | |
|---|---|---|---|---|
| 1,954,625 A * | 4/1934 | Hellstrom | ................ | D21C 7/14 162/243 |
| 4,161,957 A | 7/1979 | Schoellkopf | | |
| 5,305,631 A * | 4/1994 | Whited | .................. | C23F 13/02 220/565 |

(Continued)

FOREIGN PATENT DOCUMENTS

| | | |
|---|---|---|
| CA | 3068886 A1 | 4/2020 |

OTHER PUBLICATIONS

Office Action dated Oct. 12, 2023, U.S. Appl. No. 16/729,708, 7 pages.

(Continued)

*Primary Examiner* — David L Sorkin

(74) *Attorney, Agent, or Firm* — MH2 Technology Law Group, LLP

(57) ABSTRACT

A storage container for storing quantities of acids and other volatile liquids is described having a recirculation system that can include a recirculation pump and a recirculation line that goes from a bottom end of the container toward a top end of the container, where the recirculation line has a plurality of pressure relief valves spaced along its length. The storage container may also include a leak detection system and a high level warning system.

22 Claims, 7 Drawing Sheets

(56) References Cited

U.S. PATENT DOCUMENTS

| | | | | |
|---|---|---|---|---|
| 6,065,860 | A * | 5/2000 | Fuchsbichler .......... | B01F 25/10 366/136 |
| 8,444,312 | B2 | 5/2013 | Hagan | |
| 8,926,252 | B2 | 1/2015 | McIver | |
| 9,146,172 | B2 | 9/2015 | Trescott | |
| 9,511,929 | B2 | 12/2016 | Oren | |
| 2004/0151062 | A1 * | 8/2004 | Yao ......................... | B01F 35/88 366/137 |
| 2017/0021318 | A1 | 1/2017 | McIver | |
| 2018/0245739 | A1 | 8/2018 | Vaughn | |
| 2019/0217258 | A1 | 7/2019 | Bishop | |
| 2020/0231378 | A1 | 7/2020 | Lambert | |

OTHER PUBLICATIONS

Sorkin, Non-Final Office Action dated Apr. 3, 2023, U.S. Appl. No. 16/729,708, 19 pages.

Office Action dated Jul. 14, 2023, MX Application No. MX/a/2020/000851, 5 pages.

* cited by examiner

STORAGE SYSTEM FOR VOLATILE LIQUIDS

CROSS-REFERENCE TO RELATED APPLICATIONS

The present application is a continuation-in-part to and claims priority under 35 U.S.C. 120 to U.S. patent application Ser. No. 16/729,708 filed Dec. 30, 2019, which is hereby incorporated by reference in its entirety.

BACKGROUND OF THE INVENTION

Field of the Invention

The present invention relates to systems for storing quantities of acids and other volatile liquids. In particular, the present invention relates to a storage container for storing corrosive chemicals such as volatile liquids, and noxious acids or alkaline solutions at remote locations.

Description of the Related Art

Acids and other volatile liquids are used and stored in bulk quantities in a number of applications. Some applications may be in remote areas. In addition, the storage of volatile organics and acids may be noxious or otherwise toxic to humans and corrosive to the storage tanks, pumps, and the other equipment used. The storage tank itself must be properly prepared to handle such volatiles, especially in large volumes, for as long as possible, until the liquids are needed.

There thus exists a need for an improved system of storing and handling volatile organics and acid solutions at remote locations.

SUMMARY OF THE INVENTION

The present invention relates to systems for storing quantities of acids and other volatile liquids. In particular, the present invention relates to a storage container for storing corrosive chemicals such as volatile liquids, and noxious acids or alkaline solutions at remote locations.

One embodiment of the present invention is a storage container comprising: (a) a recirculation system including a recirculation pump and a recirculation line that goes from a bottom end of the acid silo toward a top end of the acid silo; (b) a fill line with an inlet valve; (c) a high level warning system comprising a level monitor, a high level alarm, a high level switch, and an auto-shutoff valve for closing the inlet valve; and (d) a leak detection system in communication with a leak detection alarm.

A second embodiment of the present invention is a storage container comprising: (a) a recirculation system including a recirculation pump and a recirculation line that goes from a bottom end of the acid silo toward a top end of the acid silo, wherein the recirculation line has a plurality of pressure relief valves spaced along its length; (b) a fill line with an inlet valve; and (c) a high level warning system.

Another embodiment of the present invention is a storage container comprising: (a) a recirculation system including a recirculation pump and a recirculation line that goes from a bottom end of the acid silo toward a top end of the acid silo, wherein the recirculation line has a plurality of pressure relief valves spaced along its length; (b) a fill line with an inlet valve; and (c) a high level warning system comprising a level monitor, a high level alarm, a high level switch, and an auto-shutoff valve for closing the inlet valve.

Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. The foregoing has outlined rather broadly several aspects of the present invention in order that the detailed description of the invention that follows may be better understood.

BRIEF DESCRIPTION OF THE DRAWINGS

Appended

FIG. 1 depicts a side view of a chemical storage system with a cross-sectional view of the storage containers.

FIG. 2 is a pan view of one embodiment of a storage silo.

FIG. 3 depicts one embodiment of a top end of the embodiment of the storage silo shown in FIG. 2.

FIG. 4 depicts one embodiment of a bottom end of the embodiment of the storage silo shown in FIG. 2.

FIG. 5 depicts another view of the bottom end of the storage silo shown in FIG. 4.

FIG. 6 depicts a cross-sectional view of one embodiment of a storage container having a fill line with a plurality of pressure relief valves spaced along its length.

FIG. 7 depicts a pressure relief valve and liquid outlet installed along a length of a fill line.

DESCRIPTION OF THE PREFERRED EMBODIMENTS

While the specification concludes with the claims particularly pointing and distinctly claiming the invention, it is believed that the present invention will be better understood from the following description. The present invention can comprise or consist essentially of the components of the present invention as well as other ingredients or elements described herein. As used herein, "comprising" means the elements recited, or their equivalent, plus any other element or elements which are not recited. The terms "having," "including," and "comprised of" are also to be construed as open ended unless the context suggests otherwise.

Furthermore as used herein, the term "about" refers to a +/−10% variation from the nominal value. It is to be understood that such a variation is always included in a given value provided herein, whether or not it is specifically referred to. All ranges recited herein include the endpoints, including those that recite a range "between" two values. Terms such as "about," "generally," "substantially," and the like are to be construed as modifying a term or value such that it is not an absolute. Such terms will be defined by the circumstances and the terms that they modify as those terms are understood by those of skilled in the art. This includes, at the very least, the degree of expected experimental error, technique error and instrument error for a given technique used to measure a value.

Figure 1:
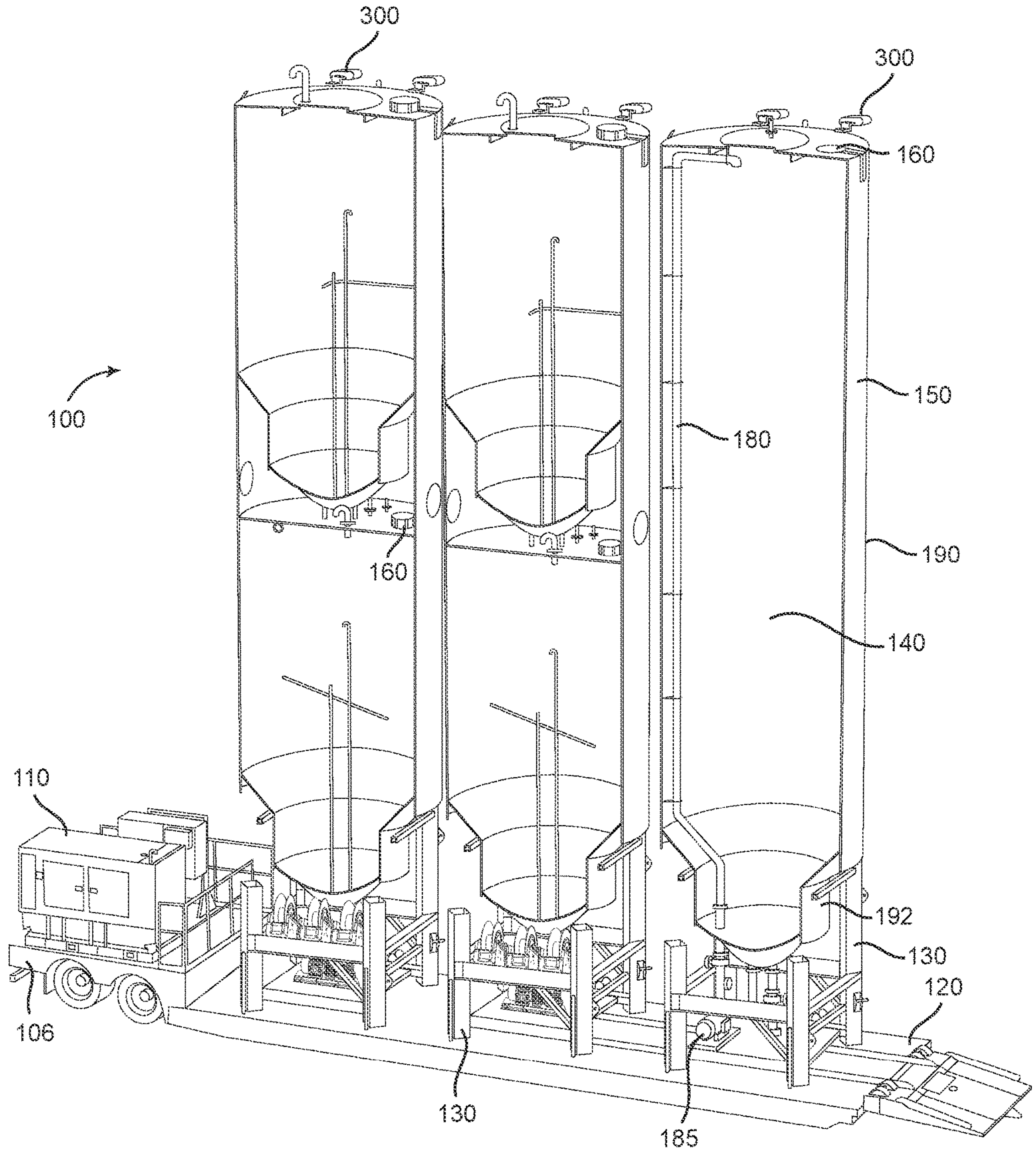
FIGS. 1-7 depict certain non-limiting embodiments of the storage system. The figures are not intended to limit the scope of the invention but, instead, are intended to provide depictions of specific embodiments, features and non-limiting characteristics of the systems described herein. The components of embodiments shown in the drawings are not necessarily drawn to scale, emphasis instead being placed upon clearly illustrating the principles of the present invention.

The present invention relates to systems for storing large quantities of volatile and/or noxious chemicals and acids. One example of such a system is depicted in FIG. 1.

The term "one embodiment" refers to one example of a method or apparatus that can carry out the inventive process described herein. However, it will be apparent to one of ordinary skill in the art that the inventive concepts within the disclosure may be practiced without the specifically described features, but be accomplished with a number of alternative components or methods.

The On-Site Chemical Storage System

One embodiment of an on-site modular storage system 100 includes a plurality of mobile storage containers, also referred to herein as silos, arranged on a base platform 120. The base platform 120 serves to stabilize any mixture of the silos 150 in the vertical position. Typically, one to three vertical free-standing silos may be positioned on a single base platform 120. The flat bottom base platform 120, allows a larger weight-bearing area on the ground resulting in lower ground pressure per unit weight of the silos.

FIG. 1 illustrates one embodiment of the on-site chemical storage system 100. FIG. 1 shows a side view of a base platform 120 with three vertically standing silos with their legs 130 secured to the base platform 120. The platform 120 typically has an operational section 106 with an attached power generator 110. The base platform 120 has a set of wheels positioned under the operational section to allow the platform to be easily transported from one location to another as though it were a trailer by attaching it to a tractor for relocation. A power distribution center is included for distribution of power to the one to three silos positioned on the base platform.

The embodiment of the storage system 100, shown in FIG. 1 includes two types of storage silos, one having two storage compartments and one described more fully herein as a storage container for volatiles or acids. Any combination of silos can be attached to the platform. The system further comprises metering pumps, flow meters, hoses, hose reels, recirculation pumps, as well as all the necessary manifolds, controls, and equipment needed to operate the system. Some embodiments of the storage system 100 will include lights 300 installed atop one or more of the silos. The lights will enable personnel to see in the nighttime and provide illumination for the site. In addition, each storage silo will generally include a manhole 160 that will provide access to the storage silo for maintenance purposes.

Storage Silo for Volatiles or Acids

Figure 2:
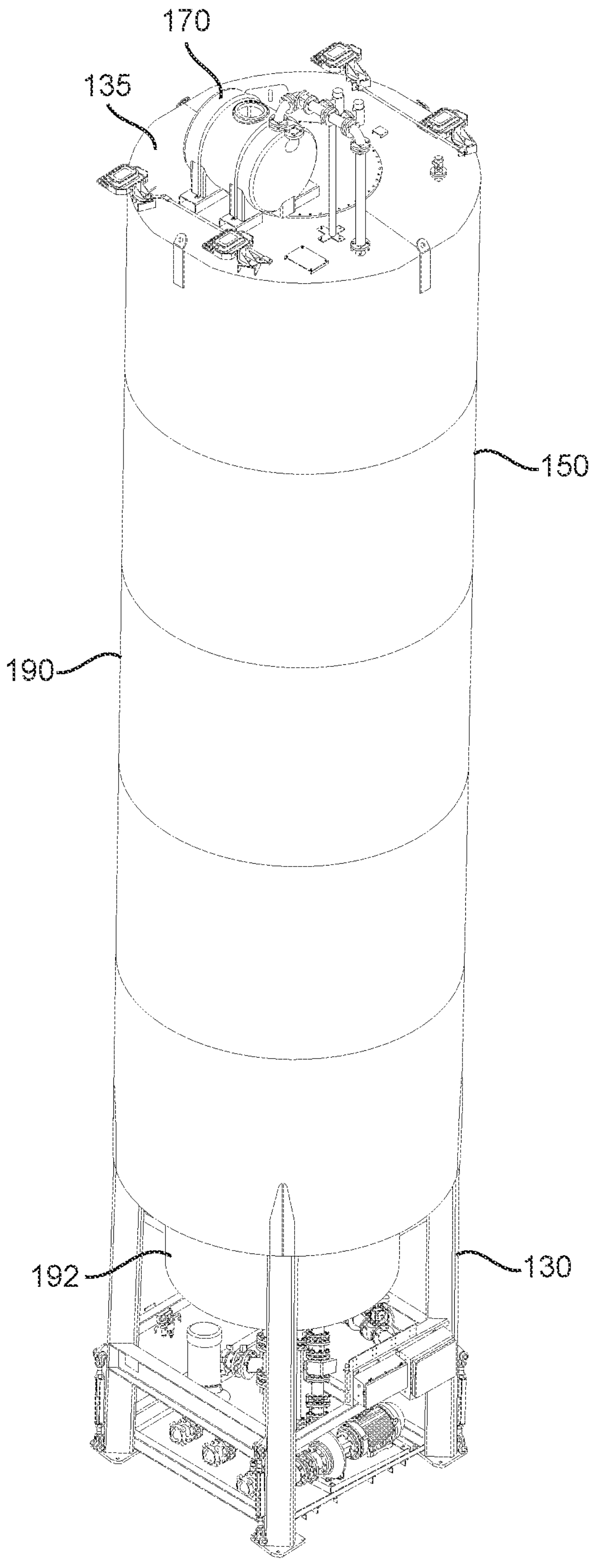

One example of a storage tank or silo 150 designed to store large amounts of volatiles or acids is shown in FIGS. 1 and 2. The illustrated storage silo 150 has a rounded body with a set of legs 130 mounted on a bottom end of the storage silo 150. The embodiment illustrated in FIG. 2 has a flat top 135 and a tubular top segment 190 connecting to one or more rounded smaller sections 192 toward the bottom end of the silo. The smaller rounded sections provide a funnel-like bottom end that ensures substantially complete drainage of fluids from the silo 150. The legs are commonly attached to a stable level platform 120 to stabilize the vertical positioning of the silo.

Preferred embodiments of the silo 150 will typically contain or store a volatile liquid. One example of a volatile and noxious solution would be a diluted acid solution such as hydrochloric or sulfuric acid. The interior 140 of the tank is typically sized to hold between 25,000-40,000 gallons of liquid with one preferred embodiment sized to have a capacity of about 33,000 gallons.

Silo Contents Circulation System. Volatile liquids such as alcohols, aldehydes, or strong acids or alkalis are often noxious and corrosive. To protect the interior of the silos, piping, flow meters, valves and other equipment that comes into contact with the stored liquid, the equipment will be manufactured from or lined with a corrosion resistant material. In addition, a corrosion inhibitor may be dissolved or suspended in the liquid. To prevent any settling of the corrosion inhibitor or other suspended material from the solution, each storage silo 150 will be equipped with a recirculation pump 185 and a recirculation or fill line 180 that goes from the bottom end of the silo or tank 150 toward the top end of the tank. Constant recirculation of the stored solution is important to keep the corrosion inhibitor well mixed or suspended in the solution and to provide constant protection for any equipment in contact with the solution. A preferred embodiment of the recirculation pump is capable of recirculating the contents of the entire silo every hour.

Optionally the circulation system will include a temperature control means to maintain the stored solution within a desired temperature range. The temperature control means may insulate the storage compartment and/or use a circulation heater in line with the circulation pump 185 and/or the circulation line 180 shown in FIG. 1 to assist in maintaining the desired temperature of the stored chemical solution.

If a silo 150 is decommissioned, either temporarily or for transport to another project, the recirculation line 180 and the recirculation pump may be used to circulate a neutralizing fluid and/or water to rinse out the silo. The acid silo is then ready for reuse with either the same or a different solution. For example, if a dilute hydrochloric acid is stored at one time and then the silo 150 is emptied and transported for use in another project to store a dilute sulfuric acid.

Optional Stepwise Filling of the Silo. The recirculation line 180 may also be used as a fill line to fill the silo with the designated liquid. The recirculation/fill line 180 shown in FIG. 1 may be used. When the recirculation line 180 is used, the recirculation pump 185 is connected to a reservoir of the designated liquid and the liquid is pumped through the fill line to the top end of the silo 150 until the silo is filled to a predetermined level with the liquid.

Figure 6:
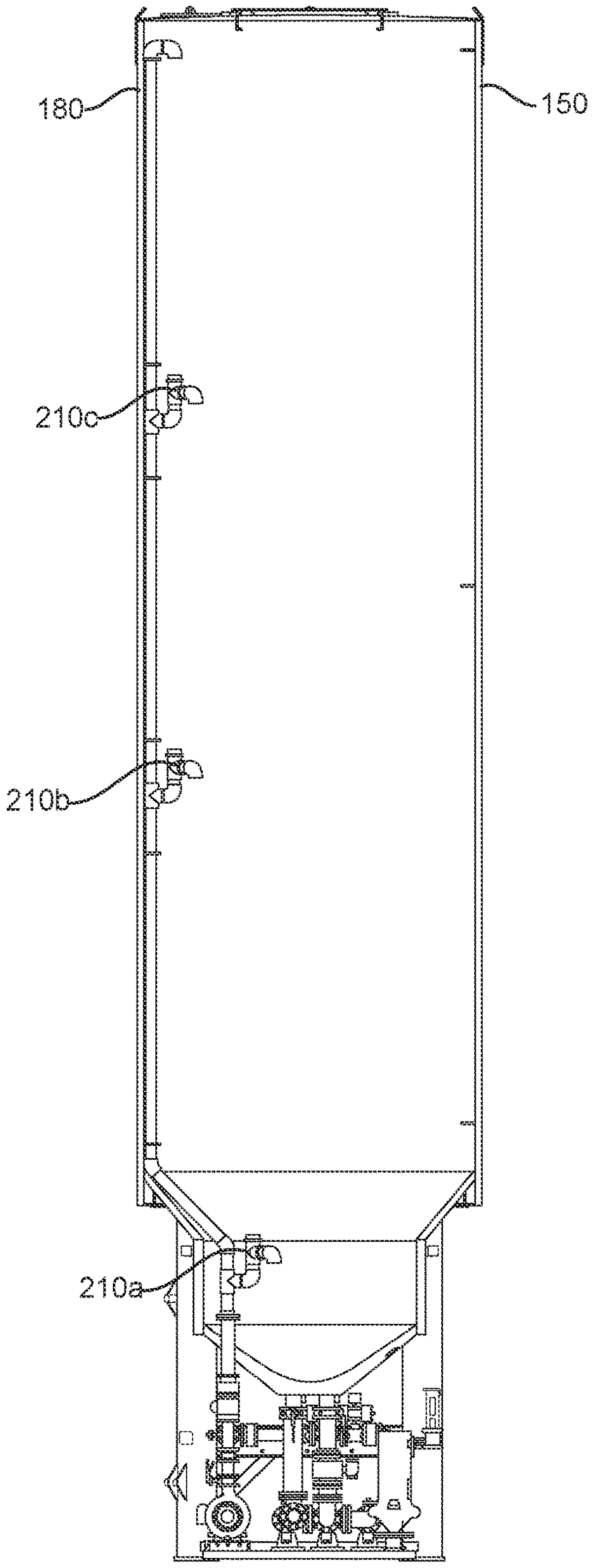
Figure 7:
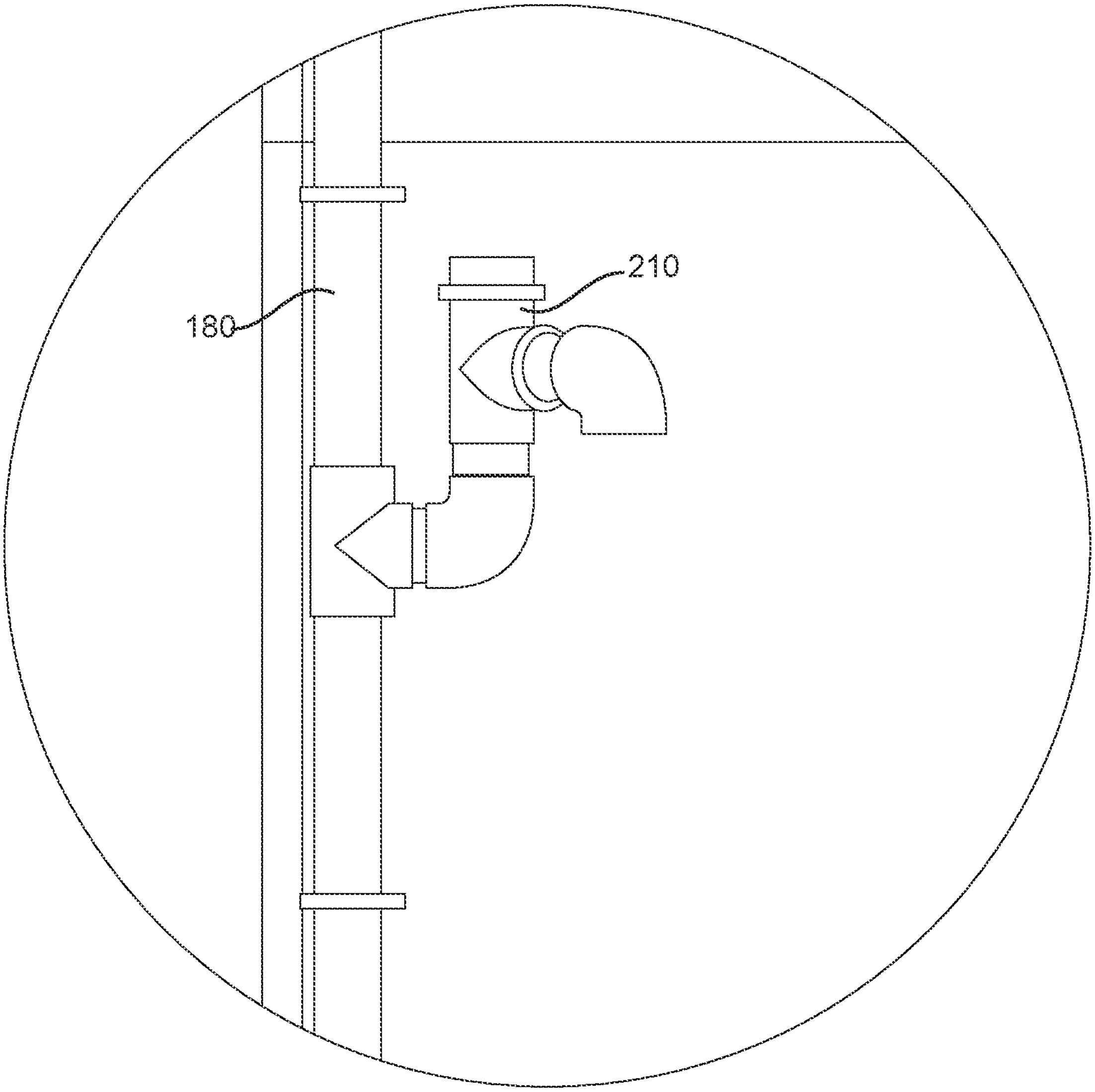

Alternatively, the silo may be filled in a stepwise manner by employing several relief valves 210 at different heights along the internal recirculation or fill line 180, as seen in FIG. 6. The valves are typically somewhat evenly spaced along the length of the fill line and each valve is selected to have a different relief pressure. Typically, the different relief pressures selected for the relief valves will decrease for the valves at a higher level in the interior tank 140.

For example, the embodiment shown in FIG. 6 has three relief valves 210*a*, 210*b*, and 210*c* installed along the internal fill pipe 180. This arrangement allows for the liquid to fill the silo or to be recirculated within the silo closer to the fluid level in the tank. This stepwise recirculating or filling of the silo 150 minimizes the distance that the liquid must fall through the air in the silo and reduces the splashing of the liquid thereby reducing the volatilization of corrosive or noxious fumes from the liquid. It may also assist in reducing foaming for certain chemicals such as detergents or surfactants.

When the stepwise filling process begins the fluid level will rise inside the fill pipe 180 until it reaches a height that will apply sufficient pressure to the lowest relief valve 210*a* to open the valve and start discharging fluid into the tank. In the embodiment illustrated in FIG. 6 the fluid will enter the silo until the level of the fluid inside the silo reaches the relief valve 210*a*. The level of fluid inside the fill pipe will continue to rise corresponding to the level of fluid inside the silo. For example, if the fluid level in the fill pipe has to reach a certain height (e.g., six feet) for relief valve 210*a* to open, then even after the fluid inside the silo reaches relief valve 210*a* the fluid level in the fill pipe will continue to rise until it reaches six feet above the level of the fluid in the tank. Once the level of fluid in the fill pipe 180 reaches six feet above the relief valve 210*a*, the pressure of the fluid will open the valve 210*a* and start releasing the fluid into the tank. Once the valve is open, every foot of fluid level increase inside the tank will cause the fluid to rise a foot inside the fill pipe.

When the level of the fluid inside the fill pipe 180 reaches the height of the next relief valve 210*b*, the level of fluid in the fill pipe will continue to rise until it reaches a sufficient height above the next relief valve 210*b* to apply enough pressure to open relief valve 210*b*. At that point, the valve 210*b* will open and start discharging fluid into the tank 150. So if the fluid level in the fill pipe has to reach a certain height (e.g., four feet) for relief valve 210*b* to open, then the drop of fluid from the relief valve 210*b* to the level of fluid in the silo will be two feet due to the six foot differential maintained after the liquid inside the silo reached the level of valve 210*a*. At this point valve 210*a* will close due to the reduced pressure setting of valve 210*b*.

Even after the fluid inside the silo reaches relief valve 210*b*, the fluid level in the fill pipe will continue to be four feet above the level of the fluid in the tank. Thus, the level of the fluid inside the pipe 180 will remain at four feet above the level of fluid inside the tank until the level of fluid in the tank reaches relief valve 210*c*. Once the level of the fluid inside the fill pipe 180 reaches a sufficient height above the next relief valve 210*c* to apply enough pressure to open relief valve 210*c*, the valve 210*c* will open and start discharging fluid into the tank 150. So if the fluid level in the fill pipe has to reach a certain height (e.g., two feet) for relief valve 210*c* to open, then the drop of fluid from the relief valve 210*c* to the level of fluid in the silo will be two feet due to the four foot differential maintained after the liquid inside the silo reached the level of valve 210*c*. At this point valve 210*b* will close due to the reduced pressure setting of valve 210*c*. The level of the fluid inside the fill pipe will remain two feet above the level inside the tank until it reaches the top exit 270 of the open fill pipe. At this point valve 210*c* will close and all of the flow will come from the top of the fill pipe.

Fume Scrubber. To protect the health of the workers and the professionals that work with and around the storage silo, the storage silo 150 may include an optional fume scrubber 170 to neutralize any noxious or corrosive fumes ventilated while the silo is being filled or recirculated. As a silo is being filled, the atmosphere at the top of the silo must be vented to prevent the build-up of pressure inside the silo.

Figure 3:
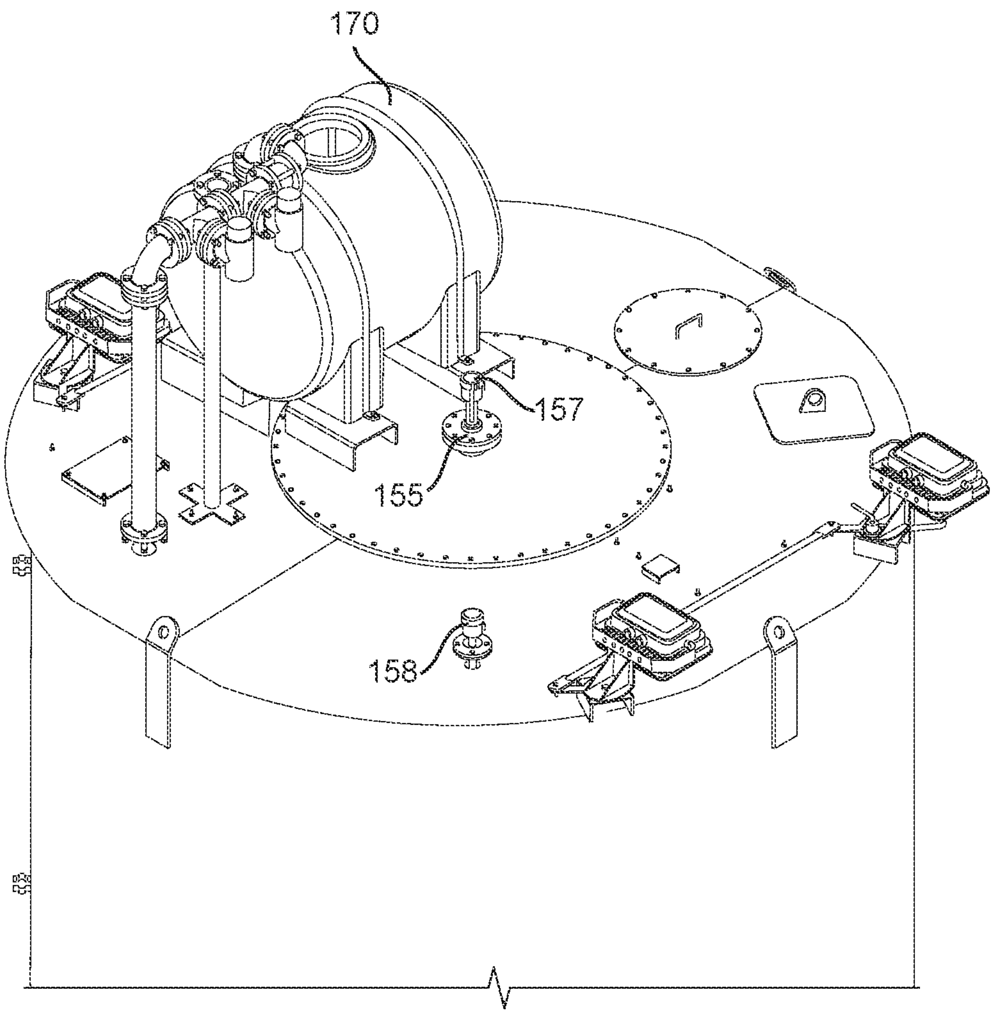

One embodiment of the fume scrubber 170 as illustrated in FIG. 3 will be a small separate tank (typically about 100 to 300 gallons) installed atop the silo 150. The fume scrubber tank 170 will store a neutralizing agent. For example, the fume scrubber tank may contain a sodium bicarbonate solution to neutralize hydrochloric acid fumes. The hydrochloric acid fumes pumped through a sodium bicarbonate solution produce a salt and carbon dioxide. Organic volatiles may be pumped through an activated charcoal tank designed to absorb the volatile organic fumes.

One of the advantages of the stepwise filling and/or recirculating the fluid in the storage tank 150 is that fewer fumes are released. This reduces the quantity of fumes that must be neutralized by the fume scrubber and increases the life of the fume scrubber.

Figure 4:
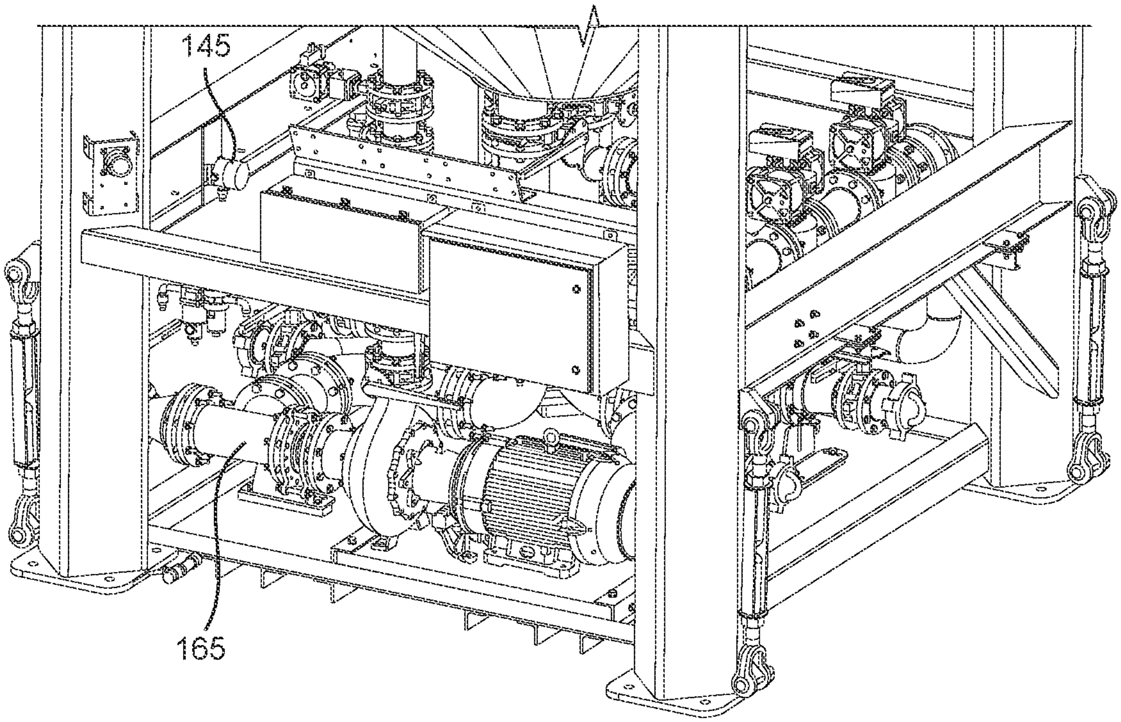

Leak Detection System. A leak detection system 145 and a spill prevention system may also be used in conjunction with the storage silo 150 to further protect the health of anyone working around the storage silo. The fumes from a caustic acid solution or certain other volatile compounds, present a health hazard for the workers nearby. The leak detection system includes a leak detector that is in communication with a leak detection alarm. The leak detection system 145 is often installed at the bottom of the storage silo 150, as shown in FIG. 4, to detect leaks that may develop in the storage silo. One embodiment of a leak detector is a vapor detector, such as a photo ionization detector sensor. The leak detector is in communication with an alarm to alert personnel of the presence of a leak in the silo.

Figure 5:
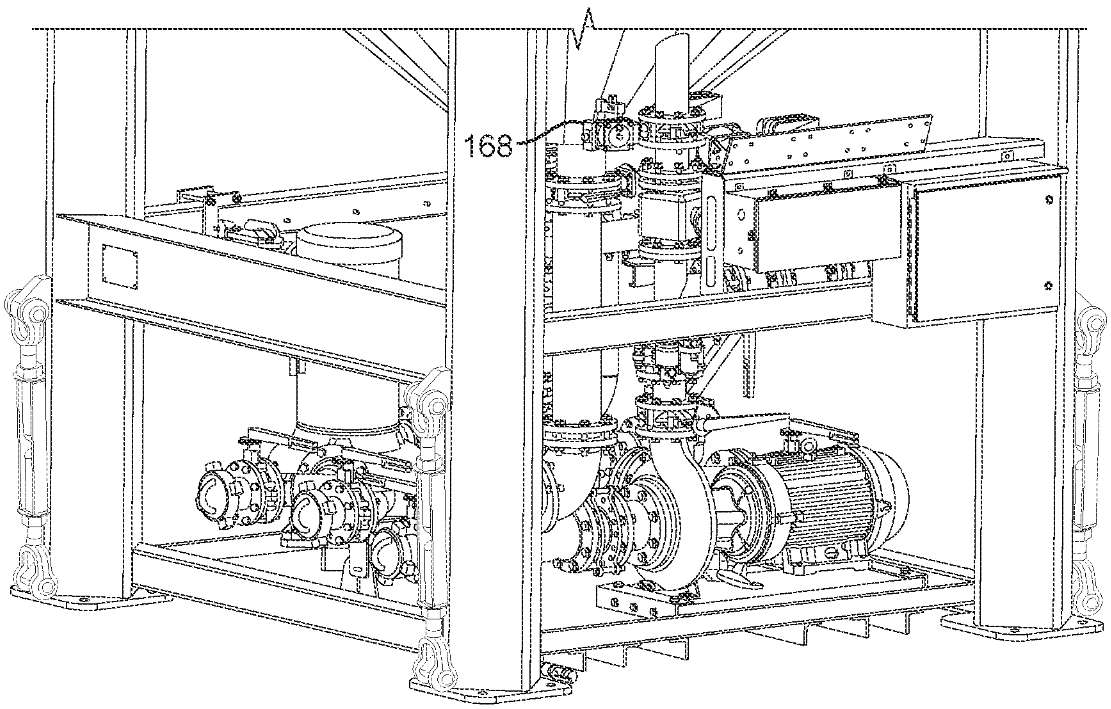

High Level Communication System. The storage silo 150 further includes a high level communication system 155 that will alert personnel in the area whenever a storage silo is approaching its capacity. Such precautions are designed to prevent overfilling the storage silo that could lead to the spilling and spraying of the volatile or noxious solution from the top of the silo 150. FIGS. 3-5 illustrate one embodiment of a high level communication system 155 that includes a level monitor 157 in communication with a high level alarm, a high level switch 158, and an auto-shutoff valve 168 to close the inlet valve in the fill connection line 165 to prevent any additional solution from entering the tank 150.

A preferred embodiment of the level monitor used for determining the real-time level of the silo contents is a non-contact monitor that may be sonic, radar, or optical. For example, a non-contact radar level probe may be used to monitor the level of the liquid in the tank 150 and to communicate its readings to the high level switch 158. Whenever the level of solution in the tank reaches a predetermined level, the communication system will close the auto-shutoff valve 168 and activate the alarm (sonic and/or visual) to notify all personnel within a prescribed area, Additional Features. The silo 150 further comprises metering pumps, flow meters, hoses, hose reels, a recirculation pump, a manifold, controls, and equipment needed to operate the silo and its filling, monitoring, and pumping of the stored material into a blender or other container. Some embodiments of the silo 150 will include a light 300 installed atop the silo. The lights will enable personnel to see in the nighttime and provide illumination for the site. In addition, the silo 150 will include a manhole 160 that will provide access to the silo for maintenance purposes. The silo 150 has a variety of connection lines. Such connection lines will generally include a process connection to connect the storage silo 150 to a blender suction line or another type of processing equipment and a fill connection line 165 used to connect to the fill line 180 whenever the silo is being filled.

The foregoing provides a detailed description of the invention which forms the subject of the claims of the invention. It should be appreciated by those skilled in the art that the general design and the specific embodiments disclosed might be readily utilized as a basis for modifying or redesigning a chemical and acid storage system to perform equivalent functions, but those skilled in the art should realized that such equivalent constructions do not depart from the spirit and scope of the invention as set forth in the appended claims.

What is claimed is:

1. A storage container comprising:

(a) a recirculation system including:

a recirculation pump;

a recirculation line that goes from a bottom end of the storage container toward a top end the storage container; and a plurality of pressure relief valves spaced vertically along the recirculation line, wherein the pressure relief valves comprise at least:

a lower pressure relief valve that is configured to actuate from a closed position to an open position in response to a first pressure; and an upper pressure relief valve that is configured to actuate from the closed position to the open position in response to a second pressure, wherein the first pressure is different than the second pressure;

(b) a fill line with an inlet valve;

(c) a high level warning system comprising a level monitor, a high level alarm, a high level switch, and an auto-shutoff valve for closing the inlet valve; and (d) a leak detection device in communication with a leak detection alarm.

2. The storage container of claim 1 further comprising a fume scrubber.

3. The storage container of claim 2, wherein the fume scrubber is a tank containing a neutralizing agent.

4. The storage container of claim 1 further comprising a manhole located on a top end of the storage container.

5. The storage container of claim 1 having a flat top, an upper tubular metal shell, and a conical bottom end.

6. The storage container of claim 1 further comprising a circulation heater in line with the circulation pump or the circulation line.

7. A storage container comprising:

(a) a recirculation system including a recirculation pump and a recirculation line that goes from a bottom end of the storage container toward a top end of the storage container, wherein the recirculation line has a plurality of pressure relief valves spaced vertically along the recirculation line, wherein the pressure relief valves comprise at least:

a lower pressure relief valve that is configured to actuate from a closed position to an open position in response to a first pressure; and an upper pressure relief valve that is configured to actuate from the closed position to the open position in response to a second pressure, wherein the first pressure is greater than the second pressure, wherein the lower and upper pressure relief valves are configured to actuate into the open position to reduce a distance that a liquid in the recirculation line falls from the lower and upper pressure relief valves to combine with a liquid in the storage container, which thereby minimizes splashing, corrosive or noxious fumes, and foaming;

(b) a fill line with an inlet valve; and (c) a high level warning system.

8. The storage container of claim 7 further comprising a fume scrubber.

9. The storage container of claim 7, wherein the high level warning system comprises a level monitor, a high level alarm, a high level switch, and an auto-shutoff valve for closing the inlet valve.

10. The storage container of claim 7 further comprising a manhole located on a top end of the storage container.

11. The storage container of claim 7 having a flat top, an upper tubular metal shell, and a conical bottom end.

12. The storage container of claim 7 further comprising a leak detection device in communication with a leak detection alarm.

13. The storage container of claim 12, wherein the leak detection device is a vapor detector.

14. A storage container comprising:

(a) a recirculation system including a recirculation pump and a recirculation 5 line that goes from a bottom end of the storage container toward a top end of the storage container, wherein the recirculation line has a plurality of pressure relief valves spaced vertically along the recirculation line, wherein the pressure relief valves comprise at least:

a lower pressure relief valve that is configured to actuate from a closed position to an open position in response to a first pressure; and an upper pressure relief valve that is configured to actuate from the closed position to the open position in response to a second pressure, wherein the first pressure is greater than the second pressure, wherein the lower and upper pressure relief valves are configured to actuate into the open position to reduce a distance that a liquid in the recirculation line falls from the lower and upper pressure relief valves to combine with a liquid in the storage container, which thereby minimizes splashing, corrosive or noxious fumes, and foaming, wherein the first pressure is in response to a level of the liquid in the recirculation line reaching a first height above the lower pressure relief valve, wherein the second pressure in in response to the level of the liquid in the recirculation line reaching a second height above the upper pressure relief valve, and wherein the first height is greater than the second height, wherein the level of the liquid in the recirculation line remains stationary at the first height above the lower pressure relief valve as a level of the liquid in the storage container increases upward toward the lower pressure relief valve, wherein the level of liquid in the recirculation line increases and remains at the first height above the level of liquid in the storage container as the level of the liquid in the storage container increases above the lower pressure valve toward the upper pressure valve, and wherein the lower pressure relief valve is configured to actuate from the open position to the closed position in response to a distance between the level of the liquid in the recirculation line and the level of the liquid in the storage container decreasing from the first height to the second height;

(b) a fill line with an inlet valve; and (c) a high level warning system having a level monitor, a high level alarm, a 10 high level switch, and an auto-shutoff valve for closing the inlet valve.

15. The storage container of claim 14, further comprising a leak detection device in communication with a leak detection alarm.

16. The storage container of claim 15, wherein the leak detection device is a photo ionization detector.

17. The storage container of claim 1, wherein the first pressure is greater than the second pressure.

18. The storage container of claim 1, wherein the lower and upper pressure relief valves are configured to actuate into the open position to reduce a distance that a liquid in the recirculation line falls from the lower and upper pressure relief valves to combine with a liquid in the storage container, which thereby minimizes splashing, corrosive or noxious fumes, and foaming.

19. The storage container of claim 1, wherein the first pressure is in response to a level of a liquid in the recirculation line reaching a first height above the lower pressure relief valve, wherein the second pressure in in response to the level of the liquid in the recirculation line reaching a second height above the upper pressure relief valve, and wherein the first height is greater than the second height.

20. The storage container of claim 19, wherein the level of the liquid in the recirculation line remains stationary at the first height above the lower pressure relief valve as a level of the liquid in the storage container increases upward toward the lower pressure relief valve.

21. The storage container of claim 20, wherein the level of liquid in the recirculation line increases and remains at the first height above the level of liquid in the storage container as the level of the liquid in the storage container increases above the lower pressure valve toward the upper pressure valve.

22. The storage container of claim 19, wherein the lower pressure relief valve is configured to actuate from the open position to the closed position in response to a distance between the level of the liquid in the recirculation line and the level of the liquid in the storage container decreasing from the first height to the second height.

* * * * *